(12) United States Patent
Subramanian et al.

(10) Patent No.: US 8,462,874 B2
(45) Date of Patent: Jun. 11, 2013

(54) METHODS AND APPARATUS FOR MINIMIZING INTER-SYMBOL INTERFERENCE IN A PEER-TO-PEER NETWORK BACKGROUND

(75) Inventors: Sundar Subramanian, Somerville, NJ (US); Aleksandar Jovicic, Jersey City, NJ (US); Saurabh Tavildar, Jersey City, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 239 days.

(21) Appl. No.: 12/835,252

(22) Filed: Jul. 13, 2010

(65) Prior Publication Data

US 2012/0014471 A1 Jan. 19, 2012

(51) Int. Cl.
*H04B 15/00* (2006.01)
(52) U.S. Cl.
USPC ............................ 375/285; 375/295; 375/316
(58) Field of Classification Search
USPC .................. 375/148, 260, 285, 350; 455/140, 455/226.1; 370/208
See application file for complete search history.

(56) References Cited

U.S. PATENT DOCUMENTS

| 6,347,127 | B1 | 2/2002 | Chen | |
|---|---|---|---|---|
| 6,377,640 | B2 | 4/2002 | Trans | |
| 6,990,324 | B2 * | 1/2006 | Laroia et al. | 455/226.1 |
| 7,301,990 | B2 * | 11/2007 | Jayaraman et al. | 375/148 |
| 7,444,127 | B2 * | 10/2008 | Laroia et al. | 455/140 |
| 7,609,614 | B2 * | 10/2009 | Fonseka et al. | 370/208 |
| 2006/0227887 | A1 * | 10/2006 | Li et al. | 375/260 |
| 2007/0110096 | A1 | 5/2007 | Geile et al. | |
| 2007/0110200 | A1 * | 5/2007 | Mergen et al. | 375/350 |
| 2007/0248114 | A1 | 10/2007 | Jia et al. | |
| 2008/0112334 | A1 | 5/2008 | Laroia et al. | |
| 2009/0016249 | A1 | 1/2009 | Li et al. | |

FOREIGN PATENT DOCUMENTS

| EP | 1489599 A1 | 12/2004 |
|---|---|---|
| EP | 1720358 A2 | 11/2006 |
| EP | 2150058 A1 | 2/2010 |
| EP | 2015485 | 10/2011 |

OTHER PUBLICATIONS

International Search Report and Written Opinion—PCT/US2011/043903—ISA/EPO—Mar. 2, 2012.

* cited by examiner

*Primary Examiner* — Daniel Washburn
*Assistant Examiner* — Fitwi Hailegiorgis
(74) *Attorney, Agent, or Firm* — Paul S. Holdaway

(57) ABSTRACT

The methods and apparatus described herein are used to operate a wireless device. One method of operating a wireless device includes filtering a first set of digital samples using a first filter at a first time to generate a first signal, transmitting the first signal, filtering a second set of digital samples using a second filter at a second time to generate a second signal, and transmitting the second signal. In one embodiment, an apparatus for operating a wireless device includes a processor configured to filter, at a first wireless device, a first set of digital samples using a first filter at a first time to generate a first signal, transmit, from the first wireless device, the first signal, and filter, at the first wireless device, a second set of digital samples using a second filter at a second time to generate a second signal.

60 Claims, 5 Drawing Sheets ns and advantages of the invention will become more apparent from the detailed description set forth below when taken in conjunction with the drawings, wherein:

METHODS AND APPARATUS FOR MINIMIZING INTER-SYMBOL INTERFERENCE IN A PEER-TO-PEER NETWORK BACKGROUND

FIELD

The invention relates to wireless communications. More particularly, the invention relates to methods and apparatus for minimizing inter-symbol interference in a peer-to-peer network.

BACKGROUND

Wireless communications continues to grow in demand and has become an integral part of both personal and business communications. Wireless communications allow users to transmit and receive data from most anywhere using wireless networks and wireless devices such as laptops, cellular devices, iPhones®, BlackBerrys®, etc.

Wireless devices are generally configured to operate in a licensed frequency spectrum and/or an unlicensed frequency spectrum (e.g., a peer-to-peer network). The licensed spectrum includes all frequency bands that require a license to operate a wireless device. In the licensed spectrum, only the spectrum licensee can build infrastructure, and allow communications and offer services across its spectrum range. The licensed spectrum is more reliable and has less traffic congestion but generally has a narrower band when compared to the unlicensed spectrum. Hence, large amounts of data may take longer to transmit using the licensed spectrum.

The unlicensed spectrum includes all frequency bands that do not require a license to operate a wireless device. In the unlicensed spectrum, any user is free to use the frequency band for short range wireless communications. Peer-to-peer direct wireless communications is performed using the unlicensed spectrum. The unlicensed spectrum is inexpensive and has a larger band when compared to the licensed spectrum but is not controlled by any third party so can be unreliable and congested due to large amounts of data passing across these frequency bands. However, when the unlicensed spectrum is not congested, it can be useful for transferring large amount of data.

In time-slotted, synchronized peer-to-peer wireless communications, time is slotted so that each packet's transmission time is exactly one slot and all the nodes (e.g., transmitters and receivers) are synchronized so that transmissions occur within slot boundaries. A target receiver expecting to receive a signal from its corresponding transmitter can experience inter-symbol interference from other peer transmissions in at least three different ways. First, inter-symbol interference can occur when other transmitters are concurrently transmitting on the same time symbol as the one on which a target receiver is expecting to receive a signal from its corresponding transmitter. Second, inter-symbol interference can occur from transmissions from other transmitters that are transmitting on time symbols before the time symbol on which the target receiver is expecting to receive a signal from its corresponding transmitter. Third, inter-symbol interference can occur from transmissions from other transmitters that are transmitting on time symbols after the time symbol on which the target receiver is expecting to receive a signal from its corresponding transmitter.

Inter-symbol interference in the second and third ways as described above are caused by the transmit filters of the interfering transmitters. For example, most every filter whether digital or analog has a delay and a "roll-off" shape which causes the desired transmission to be spread over a longer period of time than the desired time symbol. This time-domain spillage is generally unavoidable because it allows for a sharp frequency domain response of the filter.

In time-slotted, synchronized peer-to-peer wireless communications, the inter-symbol interference resulting from the time-domain spillage can be significant because of the inherently large dynamic range of transmitted signal powers. For example, the target receiver might be in close proximity to a peer that is transmitting a signal to another peer and the power level of the transmitted signal may be 60 dB or more above the anticipated signal from the transmitter to the target receiver. Even if the transmitted signal is for a prior time symbol or a subsequent time symbol when compared to the transmission time of the anticipated signal, the time-domain spillage will smear energy into the time symbol on which the target receiver is listening for the anticipated signal from the transmitter. This results in the overall signal-to-interference-plus-noise ratio (SINR) being too low for reliable detection and decoding of the anticipated signal by the target receiver.

One way of dealing with the problem of filter energy spillage is to advance or delay the target receiver's detection and decoding window to avoid this spurious energy. However, this results in the reduction of the usable portion of the current time symbol resulting in a lower achievable signal-to-noise ratio (SNR). Another drawback is that the target receiver is unable to accommodate the various delayed transmissions occurring in the current symbol in an orthogonal frequency division multiplexing (OFDM) implementation (i.e., the cyclic prefix is effectively reduced).

Therefore, it has been recognized by those skilled in the art that a need exists for methods and apparatus for minimizing inter-symbol interference in a peer-to-peer network.

SUMMARY

The methods and apparatus described herein are used to operate a wireless device and to minimize inter-symbol interference in a peer-to-peer network. One method of operating a wireless device includes filtering a first set of digital samples using a first filter at a first time to generate a first signal, transmitting the first signal, filtering a second set of digital samples using a second filter at a second time to generate a second signal, and transmitting the second signal.

In one embodiment, an apparatus for operating a wireless device includes a processor configured to filter, at a first wireless device, a first set of digital samples using a first filter at a first time to generate a first signal, transmit, from the first wireless device, the first signal, and filter, at the first wireless device, a second set of digital samples using a second filter at a second time to generate a second signal.

BRIEF DESCRIPTION OF THE DRAWINGS

The features, objects, and advantages of the invention will become more apparent from the detailed description set forth below when taken in conjunction with the drawings, wherein.

DETAILED DESCRIPTION

Methods, apparatus, and systems that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

Figure 1:
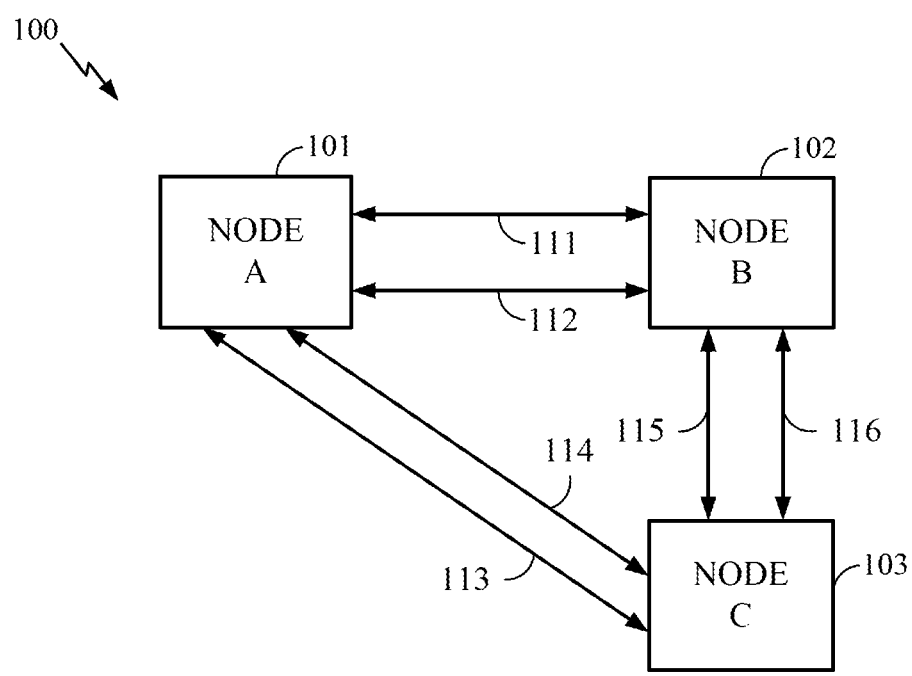
FIG. 1 is a simplified block diagram of a network having nodes A, B and C in accordance with various embodiments.

FIG. 1 is a simplified block diagram of a network 100 (also can be referred to as a system 100) having nodes A, B and C (e.g., first, second and third wireless devices 101, 102 and 103) in accordance with various embodiments. The terms "network" and "system" are often used interchangeably. For illustrative purposes, the first, second and third wireless devices 101, 102 and 103 may each be a transceiver capable of transmitting and receiving signals. Each wireless device in the network 100 is configured to minimize inter-symbol interference by using different digital filters with different time-responses according to the channel (i.e., logical group of time symbols) that is being processed by the wireless device. The first, second and third wireless devices 101, 102 and 103 may be used for peer-to-peer communications in the network 100. Each wireless device is configured to execute the algorithms, computations, and methods described herein. The algorithms, computations, and methods described herein can be implemented using hardware, software, and combinations thereof.

In various embodiments, the network 100 can include one or more networks such as a local area network (LAN), a wireless local area network (WLAN), a wireless fidelity (WiFi) network, an unlicensed network (i.e., a network operating in the unlicensed spectrum), a licensed network (i.e., a network operating in the licensed spectrum) and/or a carrier sense multiple access with collision avoidance (CSMA/CA) network.

Nodes may be dispersed throughout the network 100 and each node may be stationary or mobile. Each node may be an access terminal, a mobile station, a mobile wireless communications device, a wireless network device, a wireless local area network access point, a wide area network base-station, a wireless node, a network node, a WiFi device, a mobile device, a personal digital assistant (PDA), a cellular phone, a wireless modem, a laptop computer, a smart phone or a portable communications device configured to operate in the licensed spectrum and/or the unlicensed spectrum, or a white-space device (WSD) configured to operate in the licensed spectrum and/or the unlicensed spectrum. A WSD can be a mobile device, a laptop computer or other portable device operating in open or unused frequencies. Each node may communicate peer-to-peer with other nodes. Even though two nodes are shown in FIG. 1, the network 100 can include more than two nodes.

Figure 2:
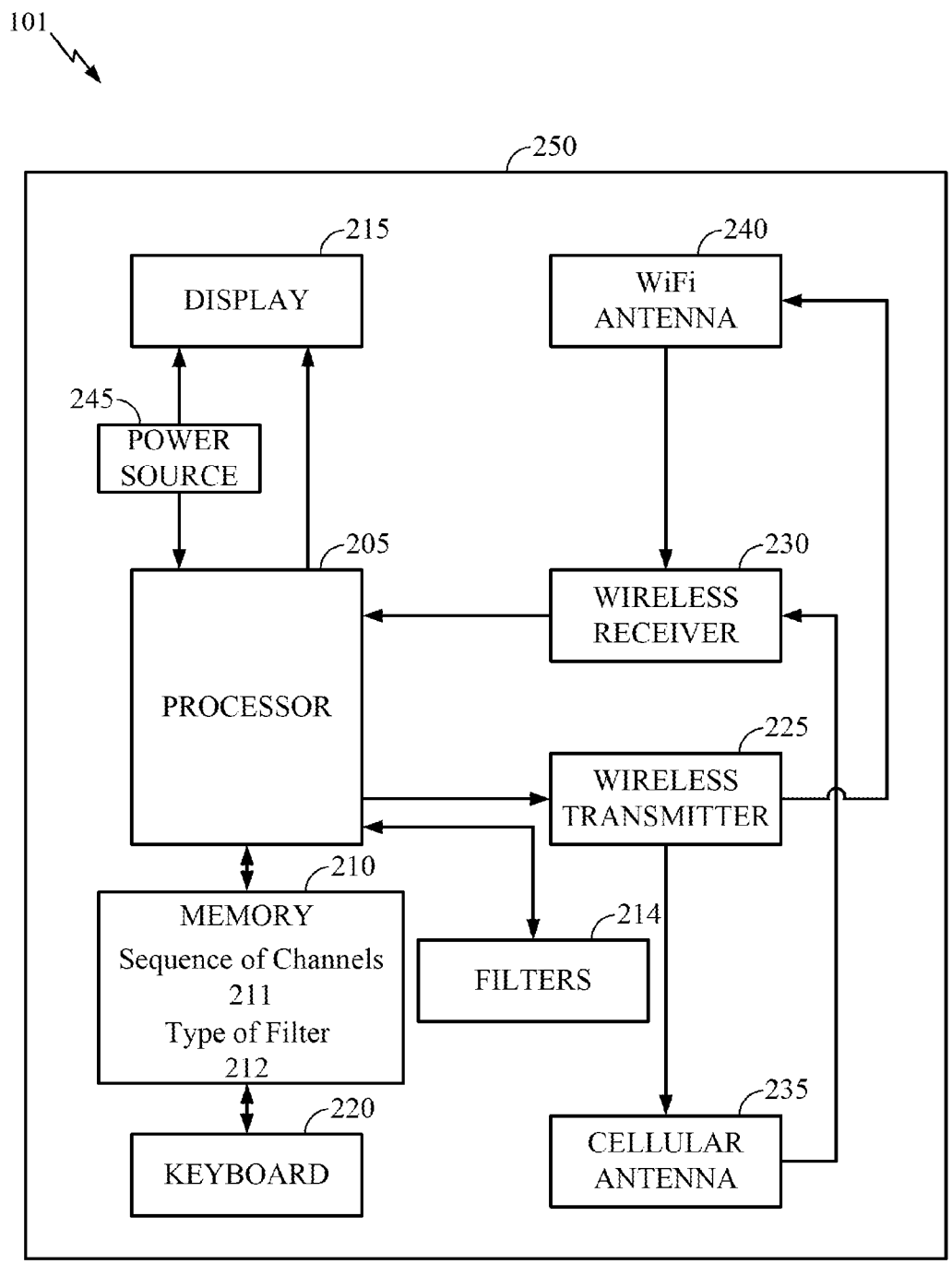
FIG. 2 is a block diagram of an exemplary node in accordance with various embodiments.

FIG. 2 is a block diagram of an exemplary node 101 (e.g., a wireless device) in accordance with various embodiments. The wireless device 101 is configured to receive and transmit signals and data in or using the licensed spectrum and/or the unlicensed spectrum. The wireless device 101 may include a processor 205, a memory 210, filters 214, a display or a touch screen 215, a keyboard 220, a wireless transmitter 225, a wireless receiver 230, a first antenna 235, a second antenna 240, and a power source 245 (e.g., a battery). The chips, components or modules may be attached or formed on a printed circuit board 250. The printed circuit board 250 can refer to any dielectric substrate, ceramic substrate, or other circuit carrying structure for carrying signal circuits and electronic components within the wireless device 101.

The processor 205 may be implemented using hardware, software, firmware, middleware, microcode, or any combination thereof. The processor 205 may be an Advanced RISC Machine (ARM), a controller, a digital signal processor (DSP), a microprocessor, an encoder, a decoder, circuitry, a processor chip, or any other device capable of processing data, and combinations thereof. The term "circuitry" may include processor circuitry, memory circuitry, RF transceiver circuitry, power circuitry, video circuitry, audio circuitry, keyboard circuitry, and display circuitry.

The memory 210 may include or store various routines and data. The term "memory" and "machine readable medium" include, but are not limited to, random access memory (RAM), flash memory, read-only memory (ROM), EPROM, EEPROM, registers, hard disk, removable disk, CD-ROM, DVD, wireless channels, and various other mediums capable of storing, containing or carrying instruction(s) and/or data. The machine readable instructions may be stored in the memory 210 and may be executed by the processor 205 to cause the processor 205 to perform various functions as described in this disclosure.

The filters 214 may be implemented using software, hardware, circuitry, and combinations thereof in the form of one or more of the following filters: a finite impulse response (FIR) filter, an infinite impulse response (IIR) filter, a linear phase filter, a minimum phase filter, and a maximum phase filter. The filters 214 may be digital time domain or frequency domain filters. The display 215 may be a LCD, LED, plasma display screen or a touch screen and the keyboard 220 may be a standard keyboard (e.g., a QWERTY layout) having letters and numbers. The keyboard 220 may be implemented on or using the touch screen.

The wireless transmitter 225 is coupled to the processor 205 and is used to encode and format the data for transmission via the first antenna 235 and/or the second antenna 240. The wireless transmitter 225 includes chips, circuitry and/or software that are used to transmit the data and/or signals that are received from the processor 205 to the first antenna 235 and/or the second antenna 240 for transmission over one or more channels.

The wireless receiver 230 is coupled to the processor 205 and is used to decode and parse the data after being received from the first antenna 235 and/or the second antenna 240. The wireless receiver 230 includes chips, circuitry and/or software that are used to receive the data and/or signals from the first antenna 235 and/or the second antenna 240. The data and/or signals are sent to the processor 205 for calculation and/or use by the processor 205.

The first antenna 235 may be positioned at a lower right portion of the wireless device 101 and the second antenna 240 may be positioned at an upper right portion of the wireless device 101. The first antenna 235 may be a cellular antenna, a GSM antenna, a CDMA antenna, a WCDMA antenna, or any other antenna capable of operating using the licensed spectrum. The second antenna 240 may be a WiFi antenna, a GPS antenna, or any other antenna capable of operating using the unlicensed spectrum. The power source 245 (e.g., a battery) supplies power to the components or modules shown in FIG. 2. The processor 205, the memory 210 and/or the filters 214 are used to produce the time-responses shown in FIGS. 3A-3E.

Figure 3A:
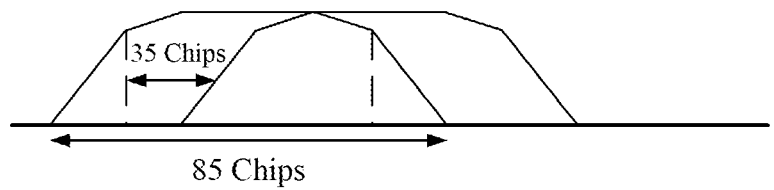
FIG. 3A is a graph of a time-response for a linear phase filter in accordance with various embodiments.

FIG. 3A is a graph of a time-response for a linear phase filter in accordance with various embodiments. As shown by the dashed lines, the front-end time-domain spillage is equal to the back-end time domain spillage.

Figure 3B:
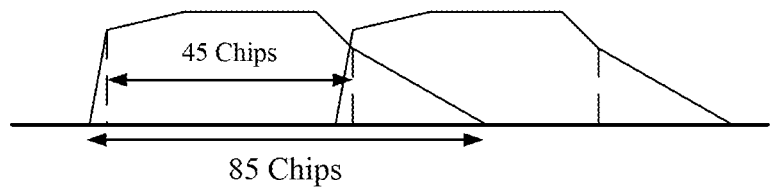
FIG. 3B is a graph of a time-response for a minimum phase filter in accordance with various embodiments.

FIG. 3B is a graph of a time-response for a minimum phase filter in accordance with various embodiments. As shown by the dashed lines, the front-end time-domain spillage is smaller than the back-end time domain spillage. Hence, the front-end roll-off time is reduced at the expense of the back-end roll-off time. A minimum phase filter is a filter which has the smallest group delay of all filters having the same magnitude response. The group delay of the filter is defined as the derivative of the phase response. The smaller the group delay of the filter, the shorter the front-end roll-off time.

Figure 3C:
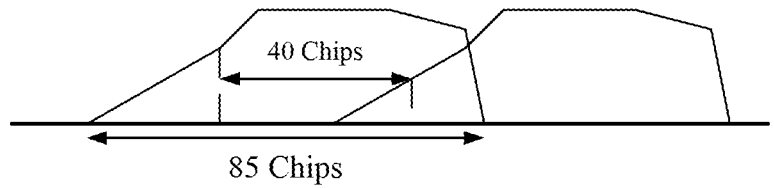
FIG. 3C is a graph of a time-response for a maximum phase filter in accordance with various embodiments.

FIG. 3C is a graph of a time-response for a maximum phase filter in accordance with various embodiments. As shown by the dashed lines, the back-end time-domain spillage is smaller than the front-end time domain spillage. A maximum phase filter is a filter which has the largest group delay of all filters having the same magnitude response. The larger the group delay of the filter, the longer the front-end roll-off time.

Figure 4:
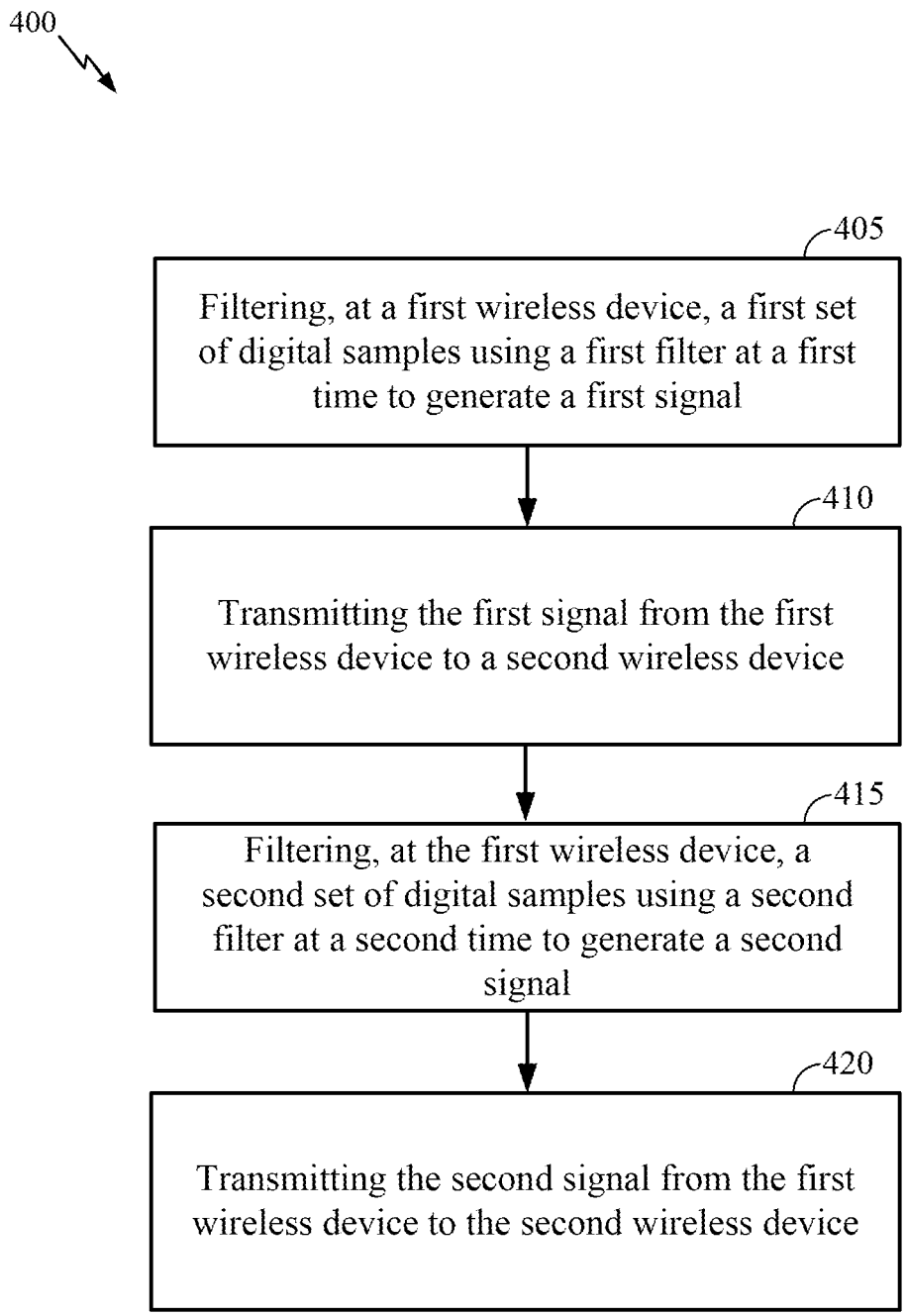
FIG. 4 is a flow chart illustrating a method of minimizing inter-symbol interference by using different digital filters with different time responses according to the channel that is being processed by the wireless device in accordance with various embodiments.

FIG. 4 is a flow chart illustrating a method 400 of minimizing inter-symbol interference by using different digital filters with different time responses according to the channel (i.e., logical group of time symbols) that is being processed by the wireless device in accordance with various embodiments. Referring to FIGS. 1-4, the network 100 includes a plurality of nodes (e.g., nodes A, B and C) that transmit and receive information as a sequence of discrete bit times or symbols over one or more channels 111-116. A symbol includes a data communication time portion, as well as a first guard time that precedes the data communication time portion and a second guard time that follows the data communication time portion. Multiple such symbols are transmitted rapidly in a back-and-forth manner such that the ending guard time of a symbol overlaps the beginning guard time of the next symbol. This overlap time may be referred to as the inter-symbol time. It is desirable that the inter-symbol time be of a very short duration in order to increase data throughput rates of the transmitter-to-receiver link.

The peer-to-peer communications between the wireless devices 101, 102 and 103 may be synchronized to the same or similar time. Hence, at any given time, all the peers know the timing and channel sequence (i.e., what channel is currently being processed) information and this information is stored in the memory 210 of all of the peers participating in peer-to-peer communications. The wireless devices 101, 102 and 103 may utilize a common clock reference to synchronize performance of distinct functions. The wireless device 101 may obtain timing signals from the wireless device 102 or 103 or a base station to synchronize operation of the wireless device 101. The wireless device 101 may obtain timing signals from other sources, such as GPS satellites. According to an illustration, the time may be meaningfully partitioned in the peer-to-peer network 100 for functions such as traffic scheduling, traffic, paging, and peer discovery. Further, each wireless device may set its own time.

Before communications in the peer-to-peer network 100 takes place, the wireless devices 101, 102 and 103 (e.g., peers) may detect and identify each other. The process by which this mutual detection and identification between peers takes place may be referred to as peer discovery. The network 100 supports peer discovery by providing that peers desiring to establish peer-to-peer communication periodically transmit short messages and listen to the transmissions of others. Transmissions for peer discovery may periodically occur during specified times referred to as peer discovery intervals, the timing of which may be predetermined by a protocol and known to the wireless devices 101, 102 and 103. The peers may also be synchronized to a common clock reference. For example, the wireless devices 101, 102 and 103 may decode a small amount of broadcast information from a locally positioned base station. The synchronization may allow for peers in a given geographic location to recognize a start and a finish of each discovery interval.

The local area peer-to-peer network and the wide area network may share a common wireless spectrum to effectuate communication; thus, bandwidth may be shared for transferring data via the disparate types of networks. For example, the peer-to-peer network and the wide area network may both communicate over the licensed spectrum. However, the peer-to-peer communication need not utilize the wide area network infrastructure.

The wireless device 101 (e.g., the processor 205) receives a first set of digital samples (e.g., control, voice or video data) and filters the first set of digital samples using a first filter 214 at a first time to generate a first signal (block 405). The wireless device 101 (e.g., the processor 205) receives a second set of digital samples (e.g., control, voice or video data) and filters the second set of digital samples using a second filter 214 at a second time to generate a second signal (block 415). Hence, the wireless device 101 is configured to filter the first set of digital samples using a first filter and filter the second set of digital samples using a second filter that is different from the first filter. The video data can be a web page data, still picture data, or streaming video data.

The first and second sets of digital samples may be digital baseband samples. In one embodiment, the channels may be a first channel 111 and a second channel 112. The third, fourth, fifth and sixth channels may be identified as 113, 114, 115 and 116. The first set of digital samples may belong to a first logical channel 111 and the second set of digital samples may belong to a second logical channel 112. The first logical channel may carry data traffic control information and the second logical channel may carry at least one of data traffic, paging data and/or peer discovery data. The data traffic control information may include one or more of the following information: traffic scheduling information, traffic information, paging information, and peer discovery information. The first filter and the second filter can be a finite impulse response (FIR) filter, an infinite impulse response (IIR) filter, a linear phase filter, a minimum phase filter, and a maximum phase filter. Preferably, the first filter is different from the second filter. For example, the first filter can be a linear phase filter and the second filter can be a minimum phase filter.

The wireless device 101 transmits the first and second signals via the first and second channels 111 and 112, for example, to the second wireless device 102 (blocks 410 and 420). The inter-symbol interference is minimized because the first and second signals are generated using different filters having different time-responses while maintaining the same magnitude response.

The wireless device 101 (e.g., the processor 205) may receive a third signal via a third channel 113 at a third time from the third wireless device 103. In one embodiment, the third time is earlier than the second time but later than the first time. The wireless device 101 obtains a third set of digital samples (e.g., voice or video data) from the third signal and filters the third set of digital samples using the first filter 214. Alternatively, the wireless device 101 (e.g., the processor 205) may receive a third signal via the first or second channel 111 or 112 at a third time from the second wireless device 102.

The wireless device 101 determines whether to transmit the second signal based on information obtained from the received third signal. Thereafter, the wireless device 101 may transmit the second signal to the wireless device 102. The information obtained from the received third signal may be a priority of scheduling information of the second wireless device 102 or the third wireless device 103. In one embodiment, the wireless device 101 determines whether to transmit the second signal based on a comparison of a priority of scheduling of the wireless device 101 and the priority of scheduling of the second wireless device 102 or the third wireless device 103. The priority of scheduling of the wireless device 101 and the priority of scheduling of the second wireless device 102 or the third wireless device 103 may be based on a global time stamp.

The processor 205 is configured to minimize inter-symbol interference by using different digital filters with different time-responses according to the channel 111 or 112 (i.e., logical group of time symbols) that is being processed by the wireless device 101. The processor 205 may store in and retrieve from the memory 210 a predetermined sequence of channels 211 and an associated type of filter 212 to be used for each predetermined sequence of channels 211. Hence, a different filter response is used for different channels.

In another embodiment, the processor 205 determines or selects the type of filter 212 to be used according to or based on an interference criterion. For example, for the first channel 211, if the interference from the later time symbol is more detrimental to the performance of the system 100 than the interference from the earlier time symbol, the processor 205 selects a filter (e.g., a minimum phase filter) which has a minimal front-end roll-off time so that the later time symbols occurring after the current time symbol spill, smear or leak only minimal energy into the current time symbol. One example of this situation is the connection scheduling channel in FlashLinQ in which the later time symbols have lower priority than the current time symbol.

If the front-end time-domain spillage from the later time symbol is significantly large, the target receiver (e.g., the second wireless device 102) could falsely yield, mistaking the energy from the later symbol as energy in the current time symbol. In this situation, the processor 205 selects a filter (e.g., a minimum phase filter) which has the shortest possible front-end roll-off time so that the later time symbols occurring after the current time symbol spill, smear or leak only minimal energy into the current time symbol.

On the other hand, for a channel (e.g., channel 112) in which the priorities are in reverse order, the processor 205 selects a filter (e.g., a maximum phase filter) which has the shortest possible back-end roll-off time so that the prior time symbols occurring before the current time symbol spill, smear or leak only minimal energy into the current time symbol.

In another example, during the data traffic channel, the processor 205 may select a linear phase filter due to the simplicity of the corresponding channel estimator and because the data traffic channel does not distinguish between inter-symbol interference occurring before or after the current symbol since all contending peers transmit over all of the time symbols in the channel.

Figure 5:
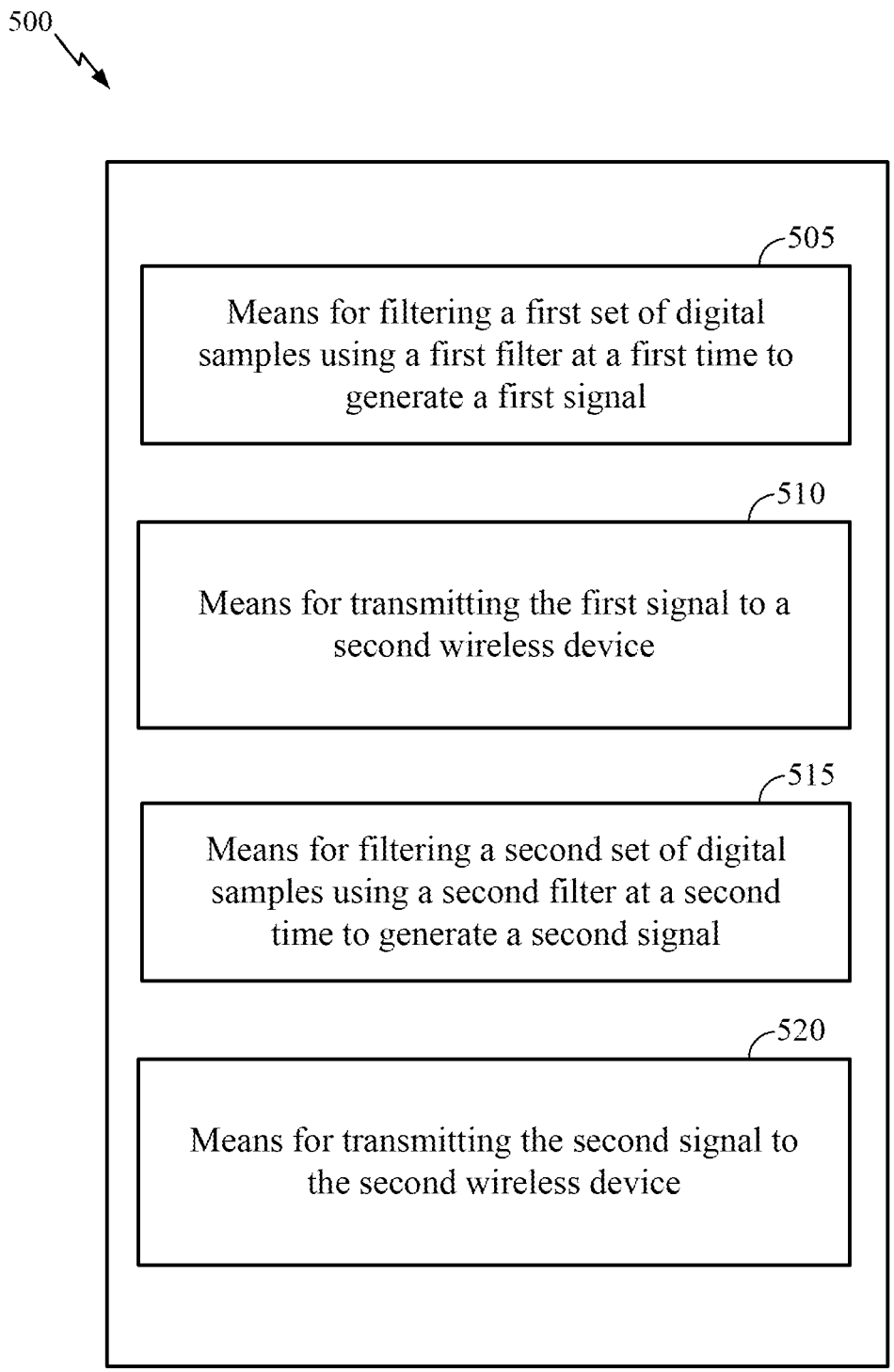
FIG. 5 is a block diagram illustrating exemplary components for the apparatus and the means for apparatus for minimizing inter-symbol interference by using different digital filters with different time responses according to the channel that is being processed by the wireless device in accordance with various embodiments.

FIG. 5 is a block diagram illustrating exemplary components for the apparatus 500 and the means for apparatus 500 for minimizing inter-symbol interference by using different digital filters with different time responses according to the channel that is being processed by the wireless device 101 in accordance with various embodiments. The apparatus 500 may include a module 505 for filtering a first set of digital samples using a first filter 214 at a first time to generate a first signal, a module 510 for transmitting the first signal to a wireless device 102, a module 515 for filtering a second set of digital samples using a second filter 214 at a second time to generate a second signal, and a module 520 for transmitting the second signal to the wireless device 102.

Those skilled in the art will appreciate that the various illustrative logical blocks, modules, circuits, and algorithms described in connection with the embodiments disclosed herein may be implemented as electronic hardware, computer software, or combinations of both. To illustrate this interchangeability of hardware and software, various illustrative components, blocks, modules, circuits, and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processing device, a digital signal processing device (DSP), an application specific integrated circuit (ASIC), a field programmable gate array (FPGA) or other programmable logic device, discrete gate or transistor logic, discrete hardware components, or any combination thereof designed to perform the functions described herein. A general purpose processing device may be a microprocessing device, but in the alternative, the processing device may be any conventional processing device, processing device, microprocessing device, or state machine. A processing device may also be implemented as a combination of computing devices, e.g., a combination of a DSP and a microprocessing device, a plurality of microprocessing devices, one or more microprocessing devices in conjunction with a DSP core or any other such configuration.

The apparatus, methods or algorithms described in connection with the embodiments disclosed herein may be embodied directly in hardware, software, or combination thereof. In software the methods or algorithms may be embodied in one or more instructions that may be executed by a processing device. The instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processing device such the processing device can read information from, and write information to, the storage medium. In the alternative, the storage medium may be integral to the processing device. The processing device and the storage medium may reside in an ASIC. The ASIC may reside in a user terminal. In the alternative, the processing device and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method of operating a wireless device, comprising:
   filtering a first set of digital samples using a first filter at a first time to generate a first signal;
   transmitting the first signal;
   filtering a second set of digital samples using a second filter at a second time to generate a second signal;
   receiving a third signal from a second wireless device at a third time;
   obtaining a third set of digital samples from the received third signal; and
   filtering the third set of digital samples using the first filter.

2. The method of claim 1, further comprising transmitting the second signal.

3. The method of claim 1, wherein the first and second sets of digital samples are digital baseband samples.

4. The method of claim 1, wherein the first set of digital samples belong to a first logical channel and the second set of digital samples belong to a second logical channel.

5. The method of claim 4 wherein the first logical channel carries data traffic control information.

6. The method of claim 5 wherein the data traffic control information is selected from a group consisting of traffic scheduling information, traffic information, paging information, and peer discovery information.

7. The method of claim 4 wherein the second logical channel carries one of data traffic, paging data or peer discovery data.

8. The method of claim 1, wherein the first filter is selected from a group consisting of a finite impulse response (FIR) filter, an infinite impulse response (IIR) filter, a linear phase filter, a minimum phase filter, and a maximum phase filter.

9. The method of claim 1, wherein the second filter is selected from a group consisting of a finite impulse response (FIR) filter, an infinite impulse response (IIR) filter, a linear phase filter, a minimum phase filter, and a maximum phase filter.

10. The method of claim 1, wherein the third time is earlier than the second time.

11. A method of operating a wireless device, comprising:
    filtering a first set of digital samples using a first filter at a first time to generate a first signal;
    transmitting the first signal;
    filtering a second set of digital samples using a second filter at a second time to generate a second signal;
    receiving a third signal from a second wireless device at a third time; and
    determining whether to transmit the second signal based on information obtained from the received third signal.

12. The method of claim 11 further comprising transmitting the second signal.

13. The method of claim 11 wherein the information obtained from the received third signal is a priority of scheduling information of the second wireless device.

14. The method of claim 13 wherein determining whether to transmit the second signal is based on a comparison of a priority of scheduling of the wireless device and the priority of scheduling of the second wireless device.

15. The method of claim 14 wherein the priority of scheduling of the wireless device and the priority of scheduling of the second wireless device is based on a global time stamp.

16. An apparatus for operating a wireless device comprising:
    a processor configured to:
    filter, at a first wireless device, a first set of digital samples using a first filter at a first time to generate a first signal;
    transmit, from the first wireless device, the first signal;
    filter, at the first wireless device, a second set of digital samples using a second filter at a second time to generate a second signal;
    receive a third signal from a second wireless device at a third time;
    obtain, at the first wireless device, a third set of digital samples from the received third signal; and
    filter, at the first wireless device, the third set of digital samples using the first filter.

17. The apparatus of claim 16, wherein the processor is further configured to transmit, from the first wireless device, the second signal.

18. The apparatus of claim 16, wherein the first and second sets of digital samples are digital baseband samples.

19. The apparatus of claim 16, wherein the first set of digital samples belong to a first logical channel and the second set of digital samples belong to a second logical channel.

20. The apparatus of claim 19 wherein the first logical channel carries data traffic control information.

21. The apparatus of claim 20 wherein the data traffic control information is selected from a group consisting of traffic scheduling information, traffic information, paging information, and peer discovery information.

22. The apparatus of claim 19 wherein the second logical channel carries one of data traffic, paging data or peer discovery data.

23. The apparatus of claim 16, wherein the first filter is selected from a group consisting of a finite impulse response (FIR) filter, an infinite impulse response (IIR) filter, a linear phase filter, a minimum phase filter, and a maximum phase filter.

24. The apparatus of claim 16, wherein the second filter is selected from a group consisting of a finite impulse response (FIR) filter, an infinite impulse response (IIR) filter, a linear phase filter, a minimum phase filter, and a maximum phase filter.

25. The apparatus of claim 16, wherein the third time is earlier than the second time.

26. An apparatus for operating a wireless device comprising:
    a processor configured to:
    filter, at a first wireless device, a first set of digital samples using a first filter at a first time to generate a first signal;

transmit, from the first wireless device, the first signal;
filter, at the first wireless device, a second set of digital samples using a second filter at a second time to generate a second signal;
receive a third signal from a second wireless device at a third time; and
determine, at the first wireless device, whether to transmit the second signal based on information obtained from the received third signal.

27. The apparatus of claim 26 wherein the processor is further configured to transmit, from the first wireless device, the second signal.

28. The apparatus of claim 26 wherein the information obtained from the received third signal is a priority of scheduling information of the second wireless device.

29. The apparatus of claim 28 wherein the processor determines whether to transmit the second signal based on a comparison of a priority of scheduling of the wireless device and the priority of scheduling of the second wireless device.

30. The apparatus of claim 29 wherein the priority of scheduling of the wireless device and the priority of scheduling of the second wireless device is based on a global time stamp.

31. A non-transitory machine-readable medium comprising instructions for operating a wireless device, the instructions upon execution cause a processor to:
filter a first set of digital samples using a first filter at a first time to generate a first signal;
transmit the first signal;
filter a second set of digital samples using a second filter at a second time to generate a second signal;
receive a third signal from a second wireless device at a third time;
obtain a third set of digital samples from the received third signal; and
filter the third set of digital samples using the first filter.

32. The non-transitory machine-readable medium of claim 31, wherein the instructions upon execution cause the processor to transmit the second signal.

33. The non-transitory machine-readable medium of claim 31, wherein the first and second sets of digital samples are digital baseband samples.

34. The non-transitory machine-readable medium of claim 31, wherein the first set of digital samples belong to a first logical channel and the second set of digital samples belong to a second logical channel.

35. The non-transitory machine-readable medium of claim 34 wherein the first logical channel carries data traffic control information.

36. The non-transitory machine-readable medium of claim 35 wherein the data traffic control information is selected from a group consisting of traffic scheduling information, traffic information, paging information, and peer discovery information.

37. The non-transitory machine-readable medium of claim 34 wherein the second logical channel carries one of data traffic, paging data or peer discovery data.

38. The non-transitory machine-readable medium of claim 31, wherein the first filter is selected from a group consisting of a finite impulse response (FIR) filter, an infinite impulse response (IIR) filter, a linear phase filter, a minimum phase filter, and a maximum phase filter.

39. The non-transitory machine-readable medium of claim 31, wherein the second filter is selected from a group consisting of a finite impulse response (FIR) filter, an infinite impulse response (IIR) filter, a linear phase filter, a minimum phase filter, and a maximum phase filter.

40. The non-transitory machine-readable medium of claim 31, wherein the third time is earlier than the second time.

41. A non-transitory machine-readable medium comprising instructions for operating a wireless device, the instructions upon execution cause a processor to:
filter a first set of digital samples using a first filter at a first time to generate a first signal;
transmit the first signal;
filter a second set of digital samples using a second filter at a second time to generate a second signal;
receive a third signal from a second wireless device at a third time; and
determine whether to transmit the second signal based on information obtained from the received third signal.

42. The non-transitory machine-readable medium of claim 41 wherein the instructions upon execution cause the processor to transmit the second signal.

43. The non-transitory machine-readable medium of claim 41 wherein the information obtained from the received third signal is a priority of scheduling information of the second wireless device.

44. The non-transitory machine-readable medium of claim 43 wherein to determine whether to transmit the second signal is based on a comparison of a priority of scheduling of the wireless device and the priority of scheduling of the second wireless device.

45. The non-transitory machine-readable medium of claim 44 wherein the priority of scheduling of the wireless device and the priority of scheduling of the second wireless device is based on a global time stamp.

46. An apparatus for operating a wireless device, comprising:
means for filtering a first set of digital samples using a first filter at a first time to generate a first signal;
means for transmitting the first signal;
means for filtering a second set of digital samples using a second filter at a second time to generate a second signal;
means for receiving a third signal from a second wireless device at a third time;
means for obtaining a third set of digital samples from the received third signal; and
means for filtering the third set of digital samples using the first filter.

47. The apparatus of claim 46, further comprising means for transmitting the second signal.

48. The apparatus of claim 46, wherein the first and second sets of digital samples are digital baseband samples.

49. The apparatus of claim 46, wherein the first set of digital samples belong to a first logical channel and the second set of digital samples belong to a second logical channel.

50. The apparatus of claim 49 wherein the first logical channel carries data traffic control information.

51. The apparatus of claim 50 wherein the data traffic control information is selected from a group consisting of traffic scheduling information, traffic information, paging information, and peer discovery information.

52. The apparatus of claim 49 wherein the second logical channel carries one of data traffic, paging data or peer discovery data.

53. The apparatus of claim 46, wherein the first filter is selected from a group consisting of a finite impulse response (FIR) filter, an infinite impulse response (IIR) filter, a linear phase filter, a minimum phase filter, and a maximum phase filter.

54. The apparatus of claim 46, wherein the second filter is selected from a group consisting of a finite impulse response (FIR) filter, an infinite impulse response (IIR) filter, a linear phase filter, a minimum phase filter, and a maximum phase filter.

55. The apparatus of claim 46, wherein the third time is earlier than the second time.

56. An apparatus for operating a wireless device, comprising:
   means for filtering a first set of digital samples using a first filter at a first time to generate a first signal;
   means for transmitting the first signal;
   means for filtering a second set of digital samples using a second filter at a second time to generate a second signal;
   means for receiving a third signal from a second wireless device at a third time; and
   means for determining whether to transmit the second signal based on information obtained from the received third signal.

57. The apparatus of claim 56 further comprising means for transmitting the second signal.

58. The apparatus of claim 56 wherein the information obtained from the received third signal is a priority of scheduling information of the second wireless device.

59. The apparatus of claim 58 wherein the means for determining whether to transmit the second signal is based on a comparison of a priority of scheduling of the wireless device and the priority of scheduling of the second wireless device.

60. The apparatus of claim 59 wherein the priority of scheduling of the wireless device and the priority of scheduling of the second wireless device is based on a global time stamp.

* * * * *